(12) United States Patent
Okamura et al.

(10) Patent No.: US 7,794,860 B2
(45) Date of Patent: Sep. 14, 2010

(54) SURFACE-COATED HIGH HARDNESS MATERIAL FOR TOOL

(75) Inventors: Katsumi Okamura, Hyogo (JP); Satoru Kukino, Hyogo (JP); Michiko Matsukawa, Hyogo (JP); Mitsuhiro Goto, Hyogo (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 91 days.

(21) Appl. No.: 12/355,021

(22) Filed: Jan. 16, 2009

(65) Prior Publication Data

US 2009/0181243 A1 Jul. 16, 2009

Related U.S. Application Data

(62) Division of application No. 10/562,485, filed as application No. PCT/JP2004/008873 on Jun. 24, 2004, now Pat. No. 7,524,569.

(30) Foreign Application Priority Data

Jun. 27, 2003 (JP) .............................. 2003-185661

(51) Int. Cl.
 *B32B 9/00* (2006.01)
(52) U.S. Cl. ........................... 428/698; 51/307; 51/309; 428/325; 428/336; 428/697; 428/699; 428/704
(58) Field of Classification Search .................. 51/307, 51/309; 428/325, 336, 697, 698, 699, 701, 428/702, 704
 See application file for complete search history.

(56) References Cited

U.S. PATENT DOCUMENTS 4,714,660 A 12/1987 Gates, Jr.

(Continued)

FOREIGN PATENT DOCUMENTS

CN 1276024 A 12/2000

(Continued)

OTHER PUBLICATIONS

International Preliminary Report on Patentability and Written Opinion issued in International Application No. PCT/JP2004/008873, mailed May 11, 2006.

(Continued)

*Primary Examiner*—Archene Turner
(74) *Attorney, Agent, or Firm*—McDermott Will & Emery LLP

(57) ABSTRACT

It is an object of the invention to provide a tool for precision finishing and grooving of quenched steel by thinning a coating film of a CBN sintered compact tool.

The invention provides a surface-coated high hardness material for tool comprising a cubic boron nitride sintered compact (CBN sintered compact, hereinafter) as a substrate and at least one coating film layer formed on the surface of the substrate wherein said coating film layer has thickness of 0.1 μm or more and less than 1 μm and comprises, as main component, a compound having at least one kind of element selected from C, N and O, and Ti and Al. If this material is used as a grooving tool, excellent performance is exhibited. Examples of the coating film are an intermediate layer, a wear-resistant film, a surface layer and the like.

6 Claims, 3 Drawing Sheets

U.S. PATENT DOCUMENTS

| | | | |
|---|---|---|---|
| 4,753,854 | A | 6/1988 | Gavrilov et al. |
| 5,030,522 | A | 7/1991 | Luthier et al. |
| 5,712,030 | A | 1/1998 | Goto et al. |
| 5,853,873 | A | 12/1998 | Kukino et al. |
| 5,879,823 | A | 3/1999 | Prizzi et al. |
| 5,882,777 | A | 3/1999 | Kukino et al. |
| 6,599,062 | B1 | 7/2003 | Oles et al. |
| 6,623,850 | B2 | 9/2003 | Kukino et al. |
| 6,730,392 | B2 | 5/2004 | Vetter et al. |
| 6,737,178 | B2 | 5/2004 | Ota et al. |
| 6,824,601 | B2 | 11/2004 | Yamamoto et al. |

FOREIGN PATENT DOCUMENTS

| | | | |
|---|---|---|---|
| CN | 1347784 | A | 5/2002 |
| CN | 1362309 | A | 8/2002 |
| EP | 1 021 584 | B1 | 9/1997 |
| EP | 1 535 680 | A1 | 6/2005 |
| JP | 8-119774 | A | 5/1996 |
| JP | 11-131215 | | 5/1999 |
| JP | 11-131217 | A | 5/1999 |
| JP | 2000-308906 | A | 11/2000 |
| JP | 2001-234328 | A | 8/2001 |
| JP | 2001-293602 | A | 10/2001 |
| JP | 2002-003284 | | 1/2002 |

OTHER PUBLICATIONS

Supplementary European Search Report issued in European Patent Application No. EP 04 74 6342, mailed Jun. 16, 2008.

Japanese Office Action, with English translation thereof, issued in Patent Application No. 2005-511032 dated on Aug. 18, 2008.

Chinese Office Action, with English translation, issued in corresponding Chinese Patent Application No. 2004800174192, dated Jul. 13, 2007.

SURFACE-COATED HIGH HARDNESS MATERIAL FOR TOOL

RELATED APPLICATIONS

This application is a Divisional of U.S. Ser. No. 10/562,485, filed Dec. 27, 2005, now U.S. Pat. No. 7,524,569 which is a U.S. National Phase under 35 U.S.C. §371 of International Application No. PCT/JP2004/008873, filed on Jun. 24, 2004, claiming priority of Japanese Patent Application No. 2003-185661, filed Jun. 27, 2003, the entire contents of each of which are hereby incorporated by reference.

TECHNICAL FIELD

The present invention relates to an improvement of a material for a tool comprising a CBN sintered compact, as a substrate, containing cubic boron nitride (CBN) as main component, on which a thin film is coated.

BACKGROUND ART

The CBN is a material having the highest hardness after diamond. Since the CBN has low reactivity with respect to metal, its sintered compact is used for cutting a heat-resistant alloy or quenched steel. In the CBN sintered compact having such high hardness also, if it is coated with a film, there is effect that a cutting edge is prevented from being worn. A cutting edge portion of the coating film is rounded, and as the thickness of the coating film is increased, this portion becomes rounder. Patent Document 1 discloses a coated CBN sintered compact having a wear-resistant layer, an intermediate layer and an outermost layer on the CBN sintered compact. There is provided a surface-coated high hardness material for a tool coated with TiAl (CNO) and the like as the wear-resistant layer, and with TiN and the like as the intermediate layer or the outermost layer.

Patent Document 2 discloses that a CBN sintered compact includes a coating film such as composite nitride and composite nitrogen carbide including titanium and aluminum. Especially, in a composite hard film coated member, a ratio of X-ray diffraction strength of crystal plane (200) of the coating film and X-ray diffraction strength of crystal plane (111) of the coating film falls in a specific range, and thickness of the coating film is 1 to 15 μm.

Patent Document 1: Japanese Patent Application Laid-open No. H8-119774, Pages 2 and 6 to 10, Tables 1, 3, 5

Patent Document 2: Japanese Patent Application Laid-open No. 2001-234328, Page 2

DISCLOSURE OF INVENTION

Problem to be Solved by the Invention

A conventional coated tool has a coating film thickness of 1 μm or more. Recently, it is desired to increase tool life in interrupted cutting such as quenched steel, and to enhance the precision of precise finishing, stability of film of the conventional coated tool becomes insufficient, and sufficient tool life can not be obtained. In interrupted cutting, if a ceramic coating film that is inferior to the CBN sintered compact in strength is thick, the film of the cutting edge is peeled off and broken by interrupted impact, the coated tool is fractured, and a work surface becomes rough. As the feed reaches coating film thickness, a cutting ratio at a portion where there is no substrate under the coating film becomes high, and the coating film becomes prone to be peeled off.

Generally, a coated cemented carbide tool is designed for efficiently cutting a work piece with large depth of cut and feed, not for cutting with high precision. Therefore, generation of peel off caused by high cutting load becomes a problem. On the other hand, high precision finished surface can be obtained by the cutting operation using a CBN tool and thus, the CBN tool is designed for finishing having smaller feed in many cases. According to view point obtained by the present inventors, even if the feed is small during the cutting, if specific cutting resistance (value obtained by dividing cutting resistance by cutting cross-sectional area) becomes high, a film becomes prone to be peeled off. The reason why the specific cutting resistance becomes high is that when feed is small, a cutting cross-sectional area becomes smaller and a presence probability of defect in a work piece becomes small and thus, the work piece strength is relatively increased (size effect of specific cutting resistance). Especially in the case of grooving which is plunge cut, a contact surface area of the cutting edge is large, and feed is smaller than that of transverse cut due to high cutting load, and the feed becomes zero when the cutting is completed. Thus, a large cutting stress is applied to the coating film, and this causes peeling off of the film. From the above reason, an object of the present invention is to prevent the coating film from being peeled off.

Further, the "round" generated in the cutting edge of the conventional coating film in the high precision cutting deteriorates the cutting accuracy, and the specific cutting resistance also becomes high. Another object of the invention is to reduce the "round".

Means for Solving Problem

The present invention provides a surface-coated high hardness material for a tool comprising a CBN sintered compact as a substrate and, formed on the surface thereof, at least one coating film layer which has thickness of 0.1 μm or more and less than 1 μm and which comprises, as main component, a compound having at least one kind of element selected from C, N and O, and at least one kind of element selected from Ti and Al. The surface-coated high hardness material for a tool of the invention includes a wear-resistant layer comprising TiAl (CNO) as the coating film. In addition, an intermediate layer and an outermost layer made of TiN and the like may be provided.

It is preferable that the coating film of the present invention comprises nitride or nitrogen carbide of Ti and Al, and when diffraction strength of (111) plane in X-ray diffraction of the coating film is I(111) and diffraction strength of (200) plane is I(200), a relation of $0 \leq I(200)/I(111) \leq 3$ is established. The diffraction strength depends on a film forming condition, but if I(200)/I(111) exceeds 3, the compressive stress is reduced, crystal grain becomes coarse, this deteriorates wear resistance and fracture resistance and thus, I(200)/I(111) was set to 3 or less.

From various experiments, it is preferable that the coating film of the present invention which is thinner than the conventional film has composition expressed by $(Ti_{1-x}Al_x)N$, $0.3 \leq X \leq 0.6$. A TiAlN-based coating film has greater thermal expansion coefficient than CBN substrate. Thus, tensile stress is generated in the coating film due to difference in shrinkage ratio thereof at the time of cooling operation after the film is completed, and residual compressive stress generated when the film is formed is moderated. As the ratio of Al in the coating film becomes higher, it is assumed that thermal expansion coefficient of the coating film becomes lower, and if X exceeds 0.6, moderation effect of compressive stress caused by difference in thermal expansion coefficient with respect to the CBN substrate is reduced, high compressive stress in the film remains, and film-peel off is generated easily at the time of cutting operation. If X is less than 0.3, hardness becomes low, wear-resistance effect can not be obtained and thus, X was set in the range of $0.3 \leq X \leq 0.6$. This range has excellent balance between wear resistance and peeling-off resistance, and is a composition suitable for interrupted cutting and grooving. It was found that more preferable range was $0.3 \leq X \leq 0.45$.

It is preferable that average diameter of crystal grain constituting the coating film of the invention is 50 nm or more and 150 nm or less. Generally, it is considered that as the crystal grain diameter is reduced, hardness of the film becomes higher and toughness becomes lower. The above range has excellent balance between wear resistance and fracture resistance, and is crystal grain diameter suitable for interrupted cutting and grooving.

It is preferable that a portion of Ti included in the coating film is replaced by at least one kind of element selected from periodic table 4a, 5a and 6a group transition metal elements excluding Si, B and Ti, a content of replaced element in the coating film is less than 10 atom %. By adding the third element in addition to Ti and Al, diameter of crystal grain constituting the coating film is further fined, equalized crystal structure is obtained and strength of the film is enhanced.

The surface-coated high hardness material for a tool of the present invention can be used as a grooving tool and in that case, remarkable effect is obtained. In the grooving, feed is small, and feed becomes zero at the groove bottom, large stress is applied to the coating film, and the film is peeled off when the coating film is thick. The coating film of the invention is thin; hence the coating film can withstand high stress which is peculiar to grooving.

The substrate used in the invention is a sintered compact comprising 30 to 90% by volume cubic boron nitride (CBN) powder and balance of bonding material, the balance bonding material comprises aluminum compound, inevitable impurities and at least one compound selected from nitride, carbide, boride, oxide of periodic table 4a, 5a and 6a elements and solid solution thereof. Here, examples of the Al compound are oxide, boride, nitride of aluminum and the like. Various bodies are known as the CBN sintered compact, and the substrate is suitable for cutting quenched steel.

More preferably, film thickness of the coating film is 0.1 μm or more and less than 0.5 μm. If the film thickness is reduced, feed at the time of cutting operation can be reduced, and high precision cutting can be carried out. The high precision cutting in the invention means cutting in which feed is 0.08 mm/rev or less. The term "film thickness" of the coating film of the invention means total film thickness of various layers such as the intermediate layer, the wear-resistant layer and the outermost layer.

The cutting tool made of surface-coated high hardness material for a tool of the present invention can be used as a dry tool of course, and as a wet tool. In the interrupted cutting, thermal cycle is remarkable and dry cutting is preferable in terms of tool life, but wet cutting is preferable in terms of size precision in some cases. At that time, since thermal expansion coefficients of CBN substrate and hard coating film are different from each other, film peeling off and film breaking are generated in the conventional film due to thermal cycle in addition to interrupted impact, and sufficient wear suppressing effect can not be obtained. According to the present invention, however, fracture resistance of the film itself is enhanced by applying compressive stress, and the thickness of the film is reduced, thereby suppressing the entire stress depending upon thermal stress generated by the thermal cycle, and largely enhancing the peeling-off resistance. Therefore, film-breaking and film-peel off are not generated easily during interrupted cutting operation under wet conditions, and sufficient wear-resistance suppressing effect can be obtained.

Effect of the Invention

According to the surface-coated high hardness material for a tool of the present invention, a CBN sintered compact having excellent strength, hardness and toughness is thinly (as compared with a conventional film) coated with hard coating film having excellent hardness and heat-resistance, and peeling-off resistance and fracture resistance of the film are largely enhanced.

MODES FOR CARRYING OUT THE INVENTION

The present invention provides a surface-coated high hardness material for a tool that increases tool life during interrupted cutting and high precision cutting by thinning a coating film, and the invention also provides a grooving tool using this material. In interrupted cutting operation, high peeling-off resistance capable of withstanding interrupted impact is naturally required. In continuous cutting operation also, high stress is applied to the coating film when feed is small, and film-peel off is generated. This reason will be explained using FIGS. 1 to 3.

An outer diameter cutting operation includes a traverse cut in which a tool made of substrate 1 is sent in an axial direction of a work piece 3 as shown in FIG. 1, and plunge cut in which the tool is sent in a radial direction of the work piece 3 as shown in FIG. 2. In any of the cutting, the work piece 3 rotates in the direction of the arrow, the tool made of substrate 1 moves in the direction of the arrow, and the cutting proceeds when swarf having thickness which is in proportion to feed F is eliminated. A crosshatching portion surrounded by a present position of the substrate 1 shown with solid line and a position 7 of the substrate before one rotation shows a cutting cross-sectional area. As shown in FIGS. 1 and 2, the plunge cut has contact area of cutting edge larger than that of the traverse cut, and has higher cutting resistance. Therefore, in the grooving which is the plunge cut, feed is smaller than that of the traverse cut, movement of the tool is stopped at the end of the grooving, and there is a step at which the tool tip end and a bottom of the groove slide with each other.

FIG. 3 is a sectional view of a cutting portion of the work piece taken along the line A-A in FIG. 2. FIG. 3 shows a state in which a groove of the work piece is cut using a grooving tool made of material of the invention. There is a coating film 2 on a surface of the substrate 1, and the work piece 3 is rotated in the direction of the arrow to be cut. In high precision cutting or grooving, it is necessary to reduce the feed at the time of cutting. In the cutting, a width portion corresponding to the feed F is removed as swarf powder 5 to form a groove wall 6. If the feed F is reduced, thickness of a portion that is removed as swarf powder approaches the thickness of the coating film 2. In this case, of the load applied to the tool at the time of the cutting, a ratio of the load received by the coating film 2 becomes higher, and this causes the peeling off of the coating film 2. If the coating film 2 is thinned, the ratio of load applied to the substrate 1 can be increased even if the feed F is the same, and the peeling off of the coating film can be suppressed.

That is, in the grooving, feed is smaller than that of the traverse cut and cutting stress is concentrated on the tip end of the cutting edge. In the case of the conventional thick coating film, a rate of cutting stress received in the coating film becomes high, film-peel off and film fracturing are prone to be caused from the substrate. According to the grooving tool of the present invention, since the thickness of the coating film is thin, there is no problem of film-peel off and film-fracturing.

If the substrate is coated with film, a round 4 is generated on the cutting edge of the substrate as shown in FIG. 3. The coating film of the present invention is coated by PVD method, for example, but electric charge is prone to be concentrated on the cutting edge at that time, and it is not possible to prevent the cutting edge from rounding. A load applied to the round 4 is large, and the film is prone to be damaged. In this invention, since the thickness of the coating film is thin, the round can be suppressed to a small value.

The coating film of the present invention can be formed using PVD method such as ion plating. As the method for forming the coating film of the invention, an arc type ion plating method is most suitable. This method has high ionization rate of raw material element, excellent reactivity, and a coating film having excellent adhesion can be obtained by applying bias voltage to substrate. Here, the bias voltage is potential difference between substrate and metal target.

Generally, in the arc type ion plating method, constituent material of the coating film is accelerated by the bias voltage. That is, ionized metal positive ion is accelerated by applying negative bias to the substrate, and ion reaches the surface of the substrate and a film grows. A relation between the bias voltage and residual stress is disclosed in FIG. 7 of a document "Surface and Coatings Technology vol. 163-164 p. 135-143 (2003)". In this document, as the bias voltage becomes higher, residual compressive stress becomes higher, the stress reaches the extremely large value at 100V and thereafter, the residual compressive stress is lowered on the contrary.

Here, the bias voltage is "high" means that the absolute value of negative bias voltage applied to the substrate is large, and this indicates an absolute value in Table 8 and FIG. 4 shown later. If the bias voltage becomes high, striking (bombardment) effect on the substrate of accelerated positive ion is enhanced, compressive stress is increased, but there is a tendency that temperatures of the substrate and the coating film also increase, the stress is moderated, and the compressive stress is reduced from certain bias voltage. As compared with the above document, in the coating film (composition of coating film: $(Ti_{0.6}Al_{0.4})N$, film thickness: 0.45 μm) of the present invention, the residual compressive stress becomes greatest when bias voltage is 200V, and the absolute value of the residual compressive stress also becomes greater than that of the above document.

A reason thereof is considered as follows. The thermal conductivity of the CBN substrate is much greater than that of the coating film, and the thermal conductivity has function for releasing heat generated in the coating film when the film is formed, but the radiation effect depends on the film thickness. That is, it is considered that if the thickness of the film is thin, radiation effect is excellent and thus, stress moderation effect obtained by temperature rise of the coating film becomes small, and compressive stress becomes high. This means that if the coating film is thinned, higher compressive stress can be applied.

If the compressive stress in the coating film is higher, the hardness and strength of the film are increased, and if the film is thick, the entire stress (internal stress×film thickness) becomes greater, and the film is prone to be peeled off from the substrate due to cutting load. Therefore, appropriate control is necessary. Especially when the substrate is CBN sintered compact, CBN particle is chemically stable as compared with ceramic bonding phase and thus, dispersion reaction at interface with respect to the coating film is not generated easily. Further, since CBN particle has excellent mechanical strength also, surface roughness of the substrate by positive ion strike can not be obtained and thus, anchor effect is also small. Thus, when the substrate is CBN sintered compact with the conventional thickness of 1 μm or more, adhesion can not be obtained easily as compared with cemented carbide or cermet, and if the bias voltage is increased, the entire stress in the film becomes high and the coating film is peeled off at the time of cutting and thus, the film is usually formed at 100 V or lower.

When the coating film is thin as in this invention, since it is possible to control the entire stress of the coating film while maintaining high internal compressive stress, it is preferable that the bias voltage is set higher than that described above. Therefore, it is preferable that the bias voltage used in the invention is in a range of 100 V to 300 V.

In the present invention, one coating film or two or more coating films may be used. When the outermost layer is to be provided, TiN, TiCN, CrN, TiC, HfC and the like are preferable. This is because that the CBN sintered compact is black, but the film exhibits vibrant bright color. This is because that when a coated CBN sintered compact tool of the present invention provided with the outermost layer is used in mass production, it becomes easy distinguish a tool or a corner whose life is elapsed from an unused tool or an unused corner, and it enables a user to replace a tool in an efficient manner.

Embodiments of the present invention will be explained below.

Embodiment 1

Using a cemented carbide pot and a ball, TiN and aluminum were mixed at weight percentage of 80:20, and bonding material powder was obtained. Next, the bonding material and CBN powder were mixed at volume ratio of 40:60, the mixture was charged into an Mo container, and it was sintered under pressure of 50 kb (5 GPa) at temperature of 1450° C. for 20 minutes. Aluminum compound assumed as aluminum nitride, aluminum oxide and aluminum boride was included in the sintered compact. The sintered compact was processed into a chip shape (model No. SNGN120408) of the cutting tool, and into a chip shape (model No. BNGNT0250R) of the grooving tool and then, the chips were coated with coating film shown in Table 1 using ion plating method by vacuum arc discharge.

A plurality of targets were disposed in a film forming apparatus, the chip was mounted on a rotary substrate holding tool provided at the center of the targets, and a film was formed. Composition of the target was the same as metal component of the coating film, and $Ti_{0.5}Al_{0.5}$, $Ti_{0.3}Al_{0.7}$, $Ti_{0.7}Al_{0.3}$, $Ti_{0.6}Al_{0.4}$, Ti or the like was used. First, the film forming apparatus was decompressed to a degree of vacuum of $1.33 \times 10^{-3}$ Pa ($10^{-5}$ torr), Ar gas was introduced into the apparatus, voltage of −1000 V was applied to the chip in atmosphere of 1.33 Pa ($10^{-2}$ torr), and the chip was cleaned. Next, the chip was heated to 500° C., the Ar gas was exhausted and then, $N_2$ gas was introduced as reaction gas, −120 V voltage was applied to the chip, the targets were vaporized and ionized at arc current of 100 A by the vacuum arc discharge and were coated. The pressure was 1.33 Pa ($10^{-2}$ torr), and film thickness was controlled by coating time.

When coating film included C and O in addition to N, as the reaction gas, $CH_4$ and $O_2$ were added to $N_2$, the flow rate was adjusted to adjust the ratio of C, N and O. TiN was coated as the intermediate layer and the outermost layer. At that time, Ti was disposed as target, and films were formed in sequence in the same manner as that described above. Samples obtained in this manner are shown in Table 1. The crystal system of the coating film was cubic type crystal structure.

TABLE 1

| Sample No. | Intermediate layer Composition | Intermediate layer Film thickness (μm) | Wear-resistant layer Composition | Wear-resistant layer Film thickness (μm) | Outermost surface layer Composition | Outermost surface layer Film thickness (μm) |
|---|---|---|---|---|---|---|
| 1 | None | | $(Ti_{0.5}Al_{0.5})N$ | 0.1 | None | |
| 2 | None | | $(Ti_{0.5}Al_{0.5})N$ | 0.2 | TiN | 0.1 |
| 3 | None | | $(Ti_{0.5}Al_{0.5})N$ | 0.3 | TiN | 0.1 |
| 4 | None | | $(Ti_{0.5}Al_{0.5})N$ | 0.7 | TiN | 0.1 |
| 5 | None | | $(Ti_{0.5}Al_{0.5})N$ | 1.2 | TiN | 0.1 |
| 6 | None | | $(Ti_{0.5}Al_{0.5})N$ | 2 | TiN | 0.1 |
| 7 | None | | $(Ti_{0.5}Al_{0.5})N$ | 5 | TiN | 0.1 |
| 8 | None | | $(Ti_{0.5}Al_{0.5})N$ | 10 | TiN | 0.1 |
| 9 | TiN | 0.05 | $(Ti_{0.5}Al_{0.5})N$ | 0.3 | TiN | 0.1 |
| 10 | TiN | 0.05 | $(Ti_{0.5}Al_{0.5})N$ | 0.3 | None | |
| 11 | None | | $(Ti_{0.6}Al_{0.4})N$ | 0.3 | TiN | 0.1 |
| 12 | None | | $(Ti_{0.6}Al_{0.4})N$ | 2.5 | TiN | 0.1 |
| 13 | None | | $(Ti_{0.3}Al_{0.7})N$ | 0.3 | TiN | 0.1 |
| 14 | None | | $(Ti_{0.3}Al_{0.7})N$ | 2.2 | TiN | 0.1 |
| 15 | None | | $(Ti_{0.5}Al_{0.5})(C_{0.2}N_{0.8})$ | 0.3 | TiN | 0.1 |
| 16 | None | | $(Ti_{0.5}Al_{0.5})(C_{0.2}N_{0.8})$ | 2.3 | TiN | 0.1 |
| 17 | None | | $(Ti_{0.5}Al_{0.5})(C_{0.8}N_{0.2})$ | 0.3 | TiN | 0.1 |
| 18 | None | | $(Ti_{0.5}Al_{0.5})(C_{0.8}N_{0.2})$ | 2.3 | TiN | 0.1 |
| 19 | None | | TiCN | 0.3 | TiN | 0.1 |
| 20 | None | | TiCN | 2.7 | TiN | 0.1 |
| 21 | TiN | 0.05 | $(Ti_{0.6}Al_{0.4})N$ | 0.7 | None | |
| 22 | TiN | 0.05 | $(Ti_{0.6}Al_{0.4})N$ | 0.7 | TiN | 0.1 |
| 23 | None | | $(Ti_{0.7}Al_{0.3})N$ | 0.8 | TiN | 0.1 |
| 24 | None | | $(Ti_{0.3}Al_{0.7})N$ | 0.8 | TiN | 0.1 |
| 25 | None | | TiCN | 0.7 | TiN | 0.1 |
| 26 | None | | None | | None | |
| 27 | None | | $(Ti_{0.6}Al_{0.3}Si_{0.1})N$ | 0.7 | None | |
| 28 | None | | $(Ti_{0.5}Al_{0.4}B_{0.1})N$ | 0.7 | None | |

In Table 1, samples Nos. 9, 10, 21 and 22 have TiN intermediate layers having film thickness of 0.05 μm between substrates and wear-resistant layers. The intermediate layer functions to enhance the bonding strength of the coating film. Samples Nos. 1, 10, 21, 27 and 28 are coating films without outermost layers. The outermost layer is made of TiN. The outermost layer is gold in color and since it is easy to identify a used corner portion of the tool, it is coated. In the samples Nos. 15 to 18, the coating film is made of nitrogen carbide or nitrogen oxide. In the samples Nos. 19, 20 and 25, the coating film is made of metal element comprising Ti only. In the samples Nos. 27 and 28, Si and B are added in addition to Ti and Al. The sample No. 26 is a commercially available tool having no coating film.

(Cutting Test 1)

Using the chips described in Table 1, a work piece formed with an oil hole was cut for 10 minutes, and interrupted cutting test (interrupted degree was 50%) was carried out. As the work piece, SCr420H (JIS) which was quenched steel whose hardness was adjusted to HRc60 was used. Here, the interrupted degree means a rate of length of idling portion with respect to length of a portion to be cut in a feed direction of the work piece. The interrupted degree of 50% in the cutting test means that half of length of the work piece to be cut was cut interruptedly. The material of the present invention is suitable for cutting operation of work piece in which interrupted cutting and continuous cutting are mixed. When a work piece is formed with a spline groove as a whole, the interrupted degree becomes 100%.

Conditions of the cutting test are as follows:
Cutting speed: 200 m/min
Feed: 0.15 mm/rev
Depth of cut: 0.2 mm
Cutting type: dry type A result obtained in this manner is shown in Table 2. A result of evaluation obtained by taking, into consideration, a combination of flank wear and a surface roughness of work surface is described in the column of evaluation. Among them, ⊚ shows the best one, and the evaluation becomes lower in the order of ○, Δ and x. The same indication is also employed in the subsequent tests. From the result, work pieces each having a coating film comprising a combination of the intermediate layer, the wear-resistant layer and the outermost layer and having thickness greater than 1 μm, and work pieces having no coating films are evaluated as x or Δ. Here, the surface roughness Rz shown in Table is a value obtained by sampling a reference length from the profile curve of the work piece measured by a surface roughness tester, and by measuring a distance between a crest line and a valley bottom line of this sampled portion in the vertical direction of the profile curve. This value is indicated in micron (1 μm=0.001 mm), and this is defined in JIS (Japan Industrial Standard) BO601 (this is also employed in the subsequent embodiments).

TABLE 2

| Sample No. | Flank wear (mm) | Surface roughness Rz (μm) | Film damage | Evaluation |
|---|---|---|---|---|
| 1 | 0.115 | 5.05 | Good | ○ |
| 2 | 0.095 | 5.21 | Good | ⊚ |
| 3 | 0.08 | 5.10 | Good | ⊚ |
| 4 | 0.07 | 5.63 | Good | ⊚ |
| 5 | 0.12 | 8.85 | Chipping | Δ |
| 6 | 0.15 | 11.30 | Peel off | x |
| 7 | 0.38 | 17.32 | Peel off | x |
| 8 | Fracture | 25.55 | Fracture | x |
| 9 | 0.085 | 4.82 | Good | ⊚ |
| 10 | 0.076 | 5.32 | Good | ⊚ |
| 11 | 0.082 | 4.31 | Good | ⊚ |
| 12 | 0.25 | 13.88 | Peel off | x |
| 13 | 0.078 | 6.93 | Good | ○ |
| 14 | 0.21 | 14.35 | Peel off | x |
| 15 | 0.11 | 7.12 | Good | ○ |
| 16 | 0.27 | 15.42 | Peel off | x |
| 17 | 0.121 | 6.80 | Good | ○ |
| 18 | 0.23 | 17.32 | Peel off | x |
| 19 | 0.091 | 7.15 | Good | ○ |
| 20 | 0.35 | 21.65 | Peel off | x |
| 21 | 0.075 | 5.31 | Good | ⊚ |
| 22 | 0.083 | 5.15 | Good | ⊚ |
| 23 | 0.085 | 5.03 | Good | ⊚ |
| 24 | 0.11 | 7.03 | Fine chipping | ○ |
| 25 | 0.12 | 7.34 | Fine chipping | ○ |
| 26 | Fracture | 21.83 | — | x |
| 27 | 0.062 | 6.02 | Good | ⊚ |
| 28 | 0.075 | 4.95 | Good | ⊚ |

(Cutting Test 2)

Using the chips described in Table 1, a work piece formed with an oil hole was cut for 10 minutes, and interrupted cutting test (interrupted degree was 50%) was carried out. As the work piece, SCr420H (JIS) which was quenched steel whose hardness was adjusted to HRc60 was used. The shape of the work piece is the same as that used in the cutting test 1. Conditions of the cutting test are as follows:

Cutting speed: 200 m/min
Feed: 0.04 mm/rev
Depth of cut: 0.1 mm
Cutting type: dry type If the cutting test conditions are compared with those of the cutting test 1, the feed is small, and the depth of cut is also small, and this cutting belongs to high precision cutting. A result of the test is shown in Table 3. Table 3 shows that the sample No. 5 having film thickness of 1.3 μm is peeled off and can not be used. The sample No. 4 having film thickness of 0.8 μm can barely be used. It is considered that this is because since the feed is small as compared with the cutting test 1, the specific cutting resistance is increased and the rate of cutting stress received within the coating film becomes high.

TABLE 3

| Sample No. | Flank wear (mm) | Surface roughness Rz (μm) | Film damage | Evaluation |
|---|---|---|---|---|
| 1 | 0.073 | 1.21 | Good | ○ |
| 3 | 0.045 | 1.37 | Good | ⊚ |
| 4 | 0.087 | 3.43 | Fine chipping | Δ |
| 5 | 0.178 | 7.32 | Peel off | x |
| 11 | 0.057 | 1.10 | Good | ⊚ |
| 23 | 0.075 | 1.27 | Good | ○ |

(Cutting Test 3)

Using the chips described in Table 1, a work piece was cut for 20 minutes, and continuous cutting test was carried out. As the work piece, SCr420H (JIS) which was quenched steel whose hardness was adjusted to HRc60 was used. Conditions of the cutting test are as follows:

Cutting speed: 200 m/min
Feed: 0.04 mm/rev
Depth of cut: 0.05 mm
Cutting type: dry type The cutting test was carried out under the condition that the depth of cut was further reduced in half as compared with the cutting test 2. In this cutting test, since the cutting was carried out continuously, the cutting time was increased to 20 minutes to grasp the performance difference of the tool. A result thereof is shown in Table 4. As can be found from the result, work pieces each having a coating film comprising a combination of the intermediate layer, the wear-resistant layer and the outermost layer and having thickness greater than 1 μm, and work pieces having no coating films are evaluated as x or Δ. By using the tool of the present invention, 1.6 S cutting (Rz is equal to or smaller than 1.6 μm) that was assumed impossible by conventional cutting could be realized.

TABLE 4

| Sample No. | Flank wear (mm) | Surface roughness Rz (μm) | Film damage | Evaluation |
|---|---|---|---|---|
| 1 | 0.090 | 1.05 | Good | ○ |
| 2 | 0.072 | 1.13 | Good | ⊚ |
| 3 | 0.062 | 1.09 | Good | ⊚ |
| 4 | 0.07 | 1.85 | Good | ○ |
| 5 | 0.087 | 3.93 | Chipping | Δ |
| 6 | 0.12 | 7.42 | Peel off | x |
| 7 | 0.22 | 8.35 | Peel off | x |
| 8 | 0.35 | 10.50 | Peel off | x |
| 9 | 0.082 | 1.01 | Good | ⊚ |
| 10 | 0.067 | 1.23 | Good | ⊚ |
| 11 | 0.072 | 0.95 | Good | ⊚ |
| 12 | 0.14 | 8.23 | Peel off | x |
| 13 | 0.061 | 1.42 | Good | ⊚ |
| 14 | 0.21 | 9.29 | Peel off | x |
| 15 | 0.052 | 1.32 | Good | ⊚ |
| 16 | 0.27 | 7.35 | Peel off | x |
| 17 | 0.058 | 1.40 | Good | ⊚ |
| 18 | 0.23 | 8.72 | Peel off | x |
| 19 | 0.075 | 1.97 | Good | ○ |
| 20 | 0.19 | 7.53 | Peel off | x |
| 21 | 0.075 | 1.71 | Good | ○ |
| 22 | 0.08 | 1.68 | Good | ○ |
| 23 | 0.093 | 1.43 | Good | ○ |
| 24 | 0.105 | 3.72 | Fine chipping | Δ |
| 25 | 0.112 | 4.21 | Fine chipping | Δ |
| 26 | Large wear | 7.42 | — | x |
| 27 | 0.063 | 1.99 | Good | ○ |
| 28 | 0.083 | 1.70 | Good | ○ |

(Cutting Test 4)

Using the chips described in Table 1, the cutting test was carried out in the same manner as that of the cutting test 1. Here, using the chips of the same samples Nos., two kinds of feeds, i.e., 0.02 mm/rev and 0.15 mm/rev were employed, the work pieces were continuously cut for 20 minutes and they were compared with each other. As the workpiece, SCr420H (JIS) which was quenched steel whose hardness was adjusted to HRc60 was used. Conditions of the cutting test are as follows:

Cutting speed: 200 m/min
Feed: as shown in Table 5
Depth of cut: 0.2 mm
Cutting type: dry type A result obtained in the test is shown in Table 5. Coating films of samples Nos. 3, 4, 5, 6 and 8 shown in the Table from the above are arranged in the thickness-increasing order, and respectively have thicknesses 0.4 μm, 0.8 μm, 1.3 μm, 2.1 μm and 10.1 μm. The sample No. 3 having thin coating film is highly regarded even if the feed as small as 0.02 mm/rev and 0.15 mm/rev, and as the thickness is increased, it is lower valued.

TABLE 5

| Sample No. | Feed (mm/rev) | Flank wear (mm) | Film damage | Evaluation |
|---|---|---|---|---|
| 3 | 0.02 | 0.09 | Good | ⊚ |
| 3 | 0.15 | 0.13 | Good | ⊚ |
| 4 | 0.02 | 0.105 | Fine chipping | ○ |
| 4 | 0.15 | 0.121 | Good | ⊚ |
| 5 | 0.02 | 0.12 | Fine chipping | Δ |
| 5 | 0.15 | 0.115 | Good | ⊚ |
| 6 | 0.02 | 0.25 | Peel off | x |
| 6 | 0.15 | 0.16 | Fine chipping | ○ |
| 8 | 0.02 | 0.56 | Peel off | x |
| 8 | 0.15 | 0.73 | Peel off | x |

(Cutting Test 5)

In this cutting test, cutting test by grooving was carried out. Using the chips described in Table 1, 120 grooves were processed in a work piece and performance was evaluated. As the work piece, SCr420H (JIS) which was quenched steel whose hardness was adjusted to HRc63 was used. Conditions of the cutting test are as follows:

Cutting speed: 200 m/min
Feed: 0.02 mm/rev
Depth of groove: 0.8 mm
Cutting type: dry type A result obtained in this test is shown in Table 6. In the grooving of quenched steel by a CBN tool, feed is smaller than normal cutting, and especially when a bottom of a groove is cut, the feed is brought into a so-called "zero cutting" state, and a load applied to a film is greater than normal turning. Even in the grooving, as a coating film thickness is thinner, it is highly evaluated in consideration of both flank wear and film damage. A chip having film thickness of less than 1 μm has especially excellent performance.

TABLE 6

| Sample No. | Flank wear (mm) | Film damage | Evaluation |
|---|---|---|---|
| 1 | 0.07 | Good | ○ |
| 2 | 0.055 | Good | ⊚ |
| 3 | 0.048 | Good | ⊚ |
| 4 | 0.04 | Good | ⊚ |
| 5 | 0.05 | Chipping | Δ |
| 6 | 0.088 | Peel off | x |
| 7 | 0.15 | Peel off | x |
| 8 | 0.23 | Peel off | x |
| 9 | 0.047 | Good | ⊚ |
| 10 | 0.044 | Good | ⊚ |
| 11 | 0.053 | Good | ⊚ |
| 12 | 0.105 | Peel off | x |
| 13 | 0.048 | Good | ⊚ |
| 14 | 0.098 | Peel off | x |
| 15 | 0.044 | Good | ⊚ |
| 16 | 0.11 | Peel off | x |
| 17 | 0.045 | Good | ⊚ |
| 18 | 0.12 | Peel off | x |
| 19 | 0.05 | Good | ⊚ |
| 20 | 0.15 | Peel off | x |
| 21 | 0.045 | Good | ⊚ |
| 22 | 0.05 | Good | ⊚ |
| 23 | 0.053 | Good | ⊚ |
| 24 | 0.047 | Good | ⊚ |
| 25 | 0.049 | Good | ⊚ |
| 26 | Large wear | — | x |
| 27 | 0.052 | Good | ⊚ |
| 28 | 0.068 | Good | ⊚ |

(Cutting Test 6)

In this cutting test, evaluation was made by grooving like the cutting test 5. Using the chips described in Table 1, 120 grooves were processed in a work piece and performance was evaluated. As the work piece, SCr420H (JIS) which was quenched steel whose hardness was adjusted to HRc63 was used. The work piece has a shape of interrupted degree 100% including a spline groove in the feed direction.

Cutting speed: 150 m/min
Feed: 0.02 mm/rev
Depth of groove: 0.8 mm
Cutting type: dry type A result obtained in this test is shown in Table 7. Even with the interrupted cutting of grooving, as a coating film thickness is thinner, flank wear resistance and film damage resistance are more excellent.

TABLE 7

| Sample No. | Flank wear (mm) | Film damage | Evaluation |
|---|---|---|---|
| 1 | 0.053 | Good | ○ |
| 2 | 0.035 | Good | ⊚ |
| 3 | 0.03 | Good | ⊚ |
| 4 | 0.052 | Fine chipping | ○ |
| 5 | 0.06 | Fine peel off | Δ |
| 6 | 0.25 | Peel off | x |
| 7 | 0.4 | Peel off | x |
| 8 | Fracture | Fracture | x |
| 9 | 0.04 | Good | ⊚ |
| 10 | 0.034 | Good | ⊚ |
| 11 | 0.032 | Good | ⊚ |
| 12 | 0.31 | Peel off | x |
| 13 | 0.038 | Good | ○ |
| 14 | 0.27 | Peel off | x |
| 15 | 0.06 | Good | ○ |
| 16 | 0.52 | Peel off | x |
| 17 | 0.055 | Good | ○ |
| 18 | 0.39 | Peel off | x |
| 19 | 0.053 | Good | ○ |
| 20 | 0.62 | Peel off | x |
| 21 | 0.051 | Fine chipping | ○ |
| 22 | 0.055 | Fine chipping | ○ |
| 23 | 0.06 | Fine chipping | ○ |
| 24 | 0.083 | Chipping | Δ |
| 25 | 0.105 | Chipping | Δ |
| 26 | Fracture | — | x |
| 27 | 0.049 | Fine chipping | ○ |
| 28 | 0.057 | Fine chipping | ○ |

Embodiment 2

Orientation and average diameter of crystal grain were changed, and effect thereof was checked. Like the embodiment 1, a surface-coated high hardness material for a tool was processed into chip shape (mode: SNGN120408). Film thickness, diffraction strength I(200)/I(111) of X-ray and average crystal grain diameter were variously changed. In this embodiment, a surface-coated high hardness material for a tool having the wear-resistant layer mainly comprised ($Ti_{0.6}Al_{0.4}$)N and no outermost layer and no intermediate layer was prepared. If the bias voltage is increased, there is a tendency that a value of I(200)/I(111) is reduced. The average crystal grain diameter has a tendency that if the bias voltage is increased, the average crystal grain diameter is reduced, and if the film thickness is reduced, the average crystal grain diameter is reduced. Chip properties obtained in this manner are shown in Table 8.

TABLE 8

| Sample No. | Bias voltage (V) | Composition | Film thickness (μm) | Crystal structure | Orientation | Average grain diameter (nm) |
|---|---|---|---|---|---|---|
| | | | | Wear-resistant layer | | |
| 41 | 150 | $(Ti_{0.6}Al_{0.4})N$ | 0.4 | Cubic system | 1.53 | 73 |
| 42 | 200 | $(Ti_{0.6}Al_{0.4})(C_{0.2}N_{0.8})$ | 0.4 | Cubic system | 2.32 | 65 |
| 43 | 120 | $(Ti_{0.6}Al_{0.4})N$ | 0.4 | Cubic system | 3.23 | 135 |
| 44 | 80 | $(Ti_{0.6}Al_{0.4})N$ | 0.7 | Cubic system | 8.3 | 260 |
| 45 | 50 | $(Ti_{0.6}Al_{0.4})N$ | 1.2 | Cubic system | 10.5 | 375 |
| 46 | 100 | $(Ti_{0.6}Al_{0.4})N$ | 0.4 | Cubic system | 2.7 | 210 |

(Cutting Test 7)

Here, using chips described in Table 8, cutting test was carried out for 10 minutes. A work piece used here was interrupted cutting test work piece that was the same as that used in the cutting test 1.

Conditions of the cutting test are as follows:
Cutting speed: 200 m/min
Feed: 0.1 mm/rev
Depth of cut: 0.2 mm
Cutting type: dry type A result obtained in the test is shown in Table 9. Especially excellent samples were samples Nos. 41 and 42 having film thickness of less than 0.5 μm, diffraction strength I(200)/I(111) of 3 or less, average grain diameter of 150 nm or less.

TABLE 9

| Sample No. | Flank wear (mm) | Surface roughness Rz (μm) | Film damage | Evaluation |
|---|---|---|---|---|
| 41 | 0.073 | 1.8 | Good | ⊚ |
| 42 | 0.83 | 1.9 | Good | ⊚ |
| 43 | 0.17 | 2.9 | Good | ○ |
| 44 | 0.25 | 3.6 | Fine chipping | △ |
| 45 | 0.31 | 5.1 | Chipping | x |
| 46 | 0.11 | 2.2 | Good | ○ |

INDUSTRIAL APPLICABILITY

The present invention can widely be utilized in a use in which a load on a coating film is large at which sufficient tool life could not be obtained in a conventional surface coated high hardness material, e.g., in an interrupted cutting field of high hardness quenched steel and in a high precision cutting field under dry condition of course, and also under wet condition. When the material of the invention is applied to a grooving tool, tool life increasing effect is especially remarkably exhibited.

EXPLANATIONS OF LETTERS OR NUMERALS

Figure 1:
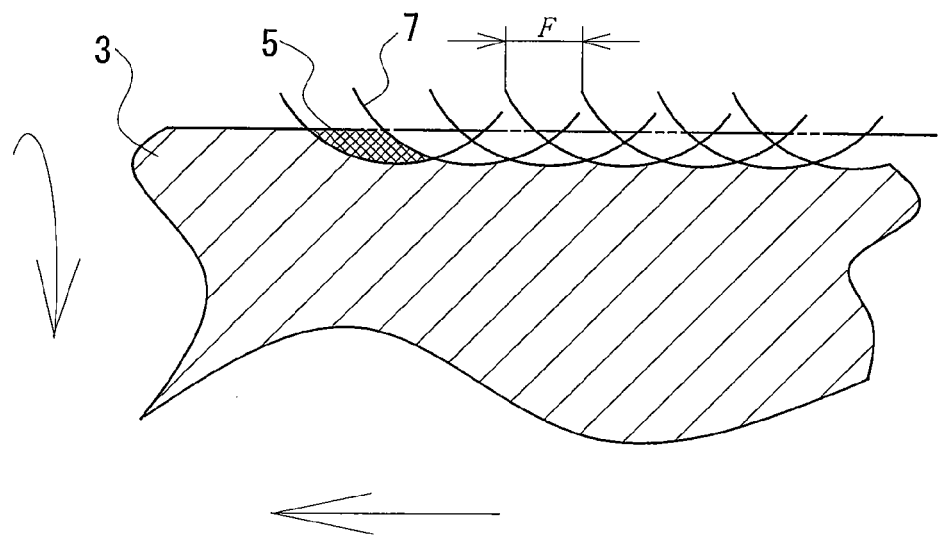
FIG. 1 is a conception diagram used for explaining a cutting cross-sectional area in a traverse cut.
Figure 2:
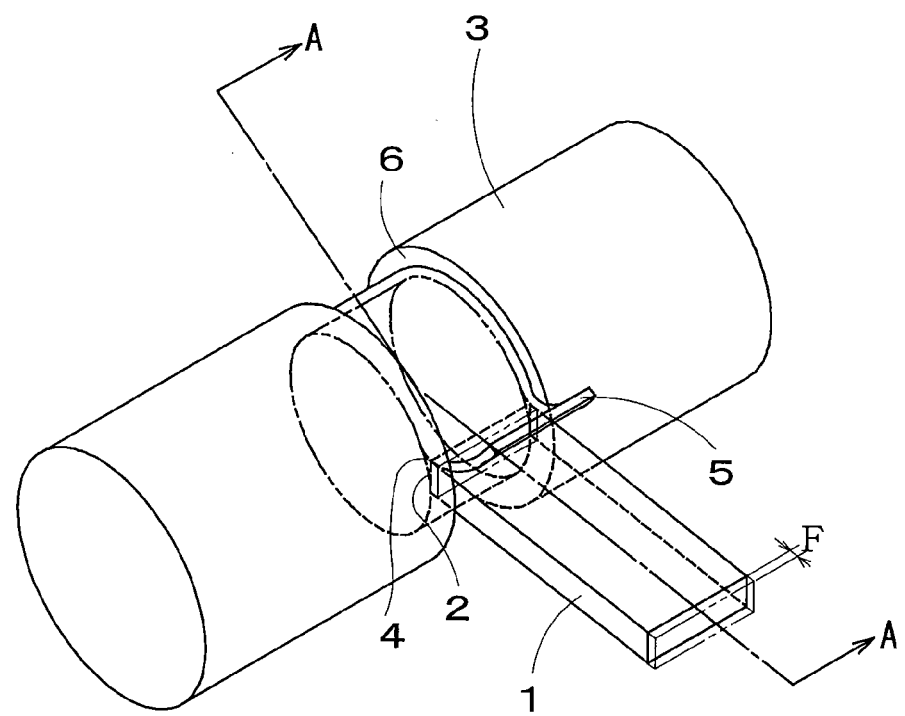
FIG. 2 is a conception diagram used for explaining a cutting cross-sectional area in a plunge cut.
Figure 3:
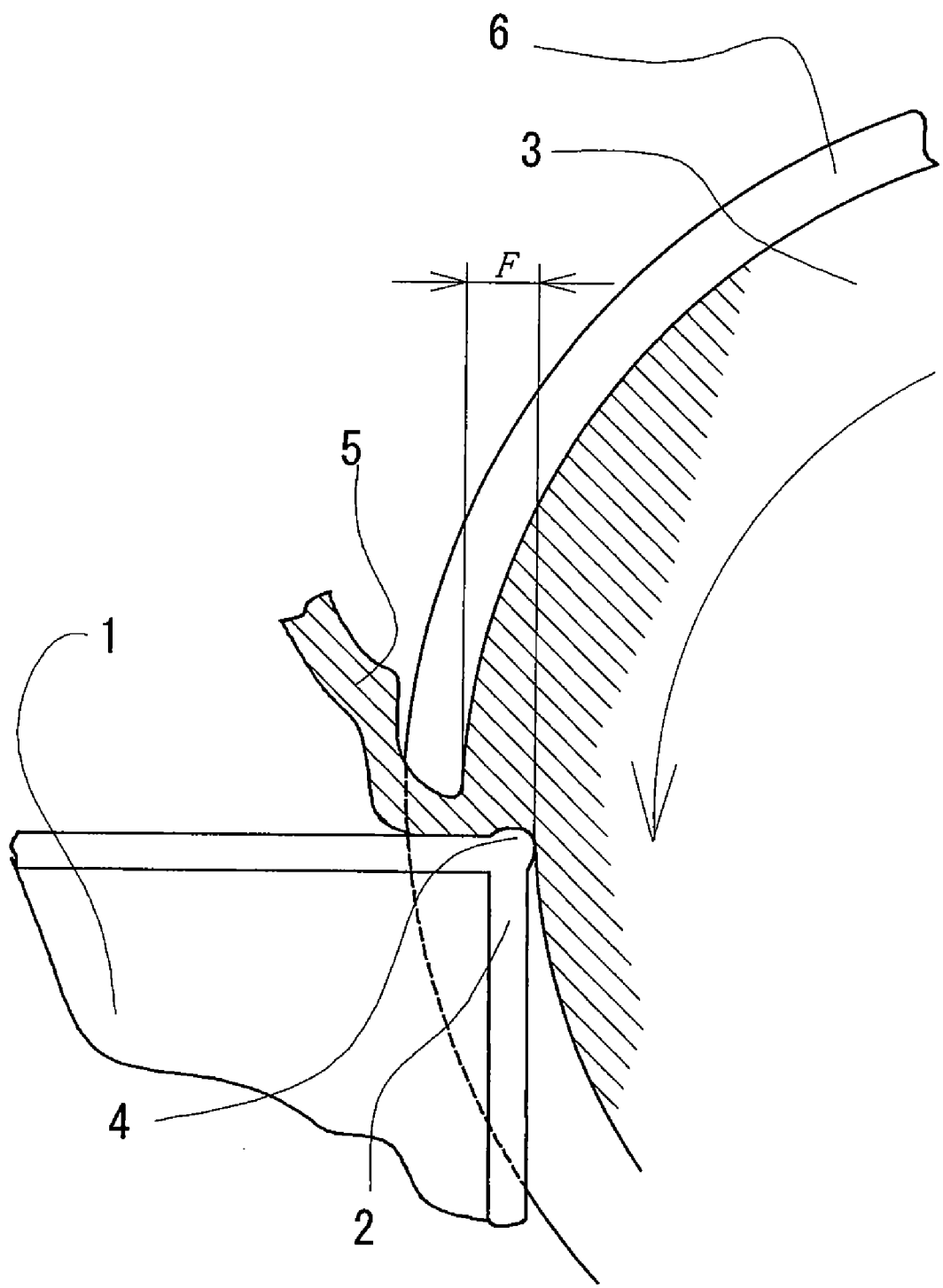
FIG. 3 is a sectional view taken along the line A-A in FIG. 2, and is a schematic diagram showing a state in which a work piece is plunge cut using a cutting tool of the present invention.
Figure 4:
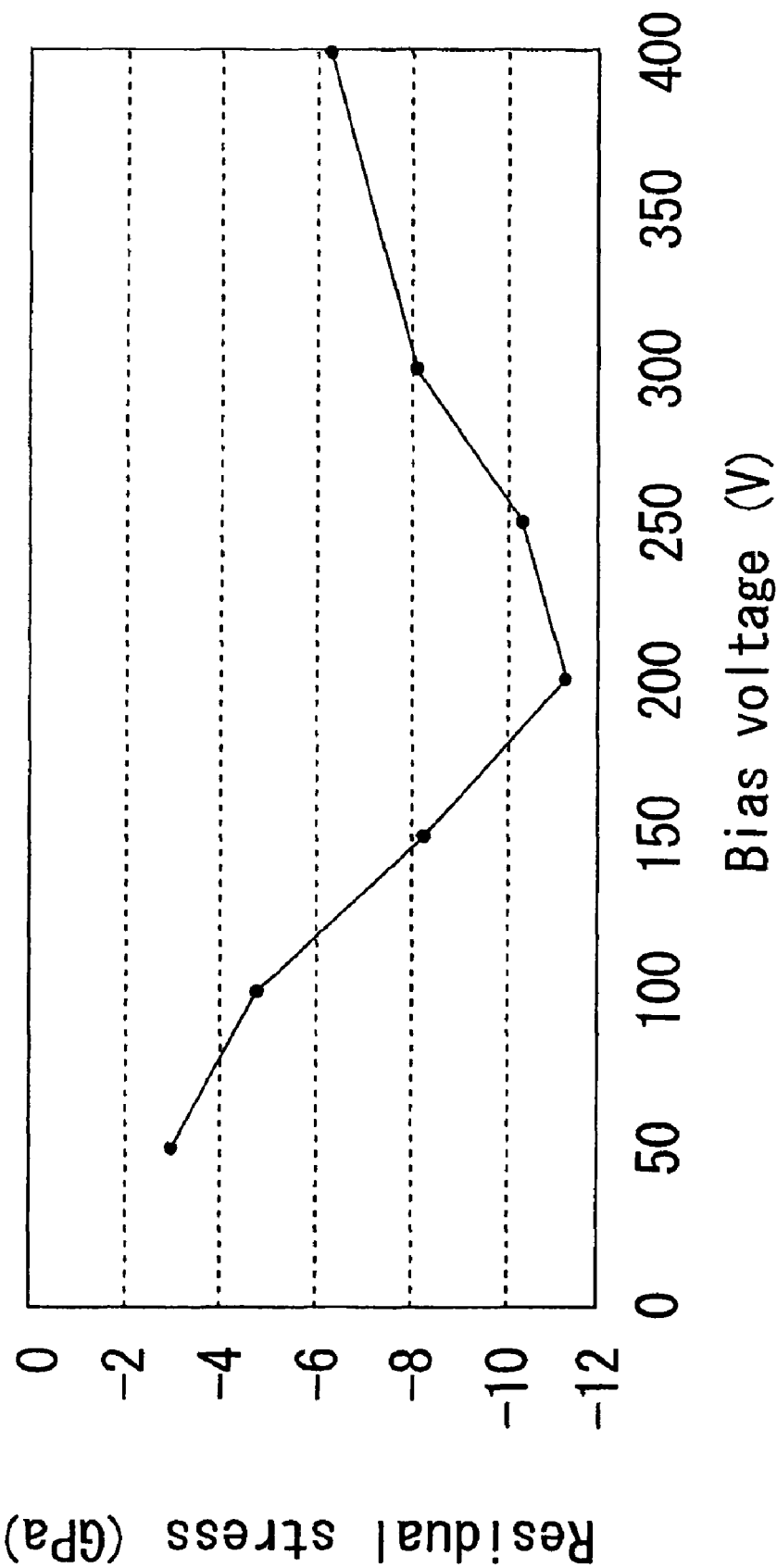
FIG. 4 is a graph showing a relation between bias voltage and residual stress.

| 1 | substrate |
| 2 | coating film |
| 3 | work piece |
| 4 | round |
| 5 | swarf powder |
| 6 | groove wall |
| 7 | position of substrate before one rotation |
| F | feed |

The invention claimed is:

1. A surface-coated high hardness material for tool comprising:
    a substrate made of a cubic boron nitride sintered compact (CBN sintered compact, hereinafter), and
    at least one coating film layer formed on the surface of the substrate,
    wherein the thickness of the coating film layer ranges from 0.1 μm or more to less than 1 μm,
    wherein the composition of the coating film is expressed by $(Ti_{1-x}Al_x)N$, $0.3 \leq X \leq 0.6$, and
    wherein a relation of $0 \leq I(200)/I(111) \leq 3$ is established when diffraction strength of (111) plane in X-ray diffraction of the coating film is I(111) and diffraction strength of (200) plane is I(200), and
    wherein average grain diameter of crystal constituting the coating film is from 50 nm to less than 150 nm.

2. The surface-coated high hardness material for a tool according to claim 1,
    wherein a portion of Ti included in the coating film is replaced by at least one element selected from periodic table 4a, 5a and 6a group transition metal elements excluding Si, B and Ti, a content of replaced element in the coating film is less than 10 atom %.

3. The surface-coated high hardness material for a tool according to claim 1, wherein the surface-coated high hardness material for a tool is used for a grooving tool.

4. The surface-coated high hardness material for a tool according to claim 1,
wherein the substrate is a sintered compact comprising 30 to 90% by volume cubic boron nitride (CBN) powder and balance of bonding material, the balance of bonding material comprises aluminum compound, inevitable impurities and at least one compound selected from nitride, carbide, boride, oxide of periodic table 4a, 5a and 6a elements and solid solution thereof.

5. The surface-coated high hardness material for a tool according to 1, wherein total film thickness of the coating film is from 0.1 μm to less than 0.5 μm.

6. The surface-coated high hardness material for a tool according to claim 1,
wherein the surface-coated high hardness material for a tool is used for high precision cutting tool for quenched steel and here, the high precision cutting means cutting having feed of 0.08 mm/rev or less.

* * * * *